(12) United States Patent
Tajima et al.

(10) Patent No.: US 10,547,091 B2
(45) Date of Patent: Jan. 28, 2020

(54) BATTERY DEVICE (71) Applicants: HONDA MOTOR CO., LTD., Tokyo (JP); IKUYO CO., LTD., Atsugi-shi, Kanagawa (JP)

(72) Inventors: Takamitsu Tajima, Wako (JP); Hirokazu Hirano, Hadano (JP); Tsuyoshi Sekiguchi, Zama (JP)

(73) Assignees: HONDA MOTOR CO., LTD., Tokyo (JP); IKUYO CO., LTD., Atsugi-shi, Kanagawa (JP)

( * ) Notice: Subject to any disclaimer, the term of this patent is extended or adjusted under 35 U.S.C. 154(b) by 106 days.

(21) Appl. No.: 15/549,451

(22) PCT Filed: Feb. 9, 2016

(86) PCT No.: PCT/JP2016/053725
§ 371 (c)(1),
(2) Date: Aug. 8, 2017

(87) PCT Pub. No.: WO2016/129571
PCT Pub. Date: Aug. 18, 2016

(65) Prior Publication Data
US 2018/0034116 A1 Feb. 1, 2018

(30) Foreign Application Priority Data
Feb. 9, 2015 (JP) .................................. 2015-023481

(51) Int. Cl.
*H01M 10/66* (2014.01)
*H01M 10/613* (2014.01)
(Continued)

(52) U.S. Cl.
CPC ....... *H01M 10/613* (2015.04); *H01M 10/625* (2015.04); *H01M 10/6555* (2015.04);
(Continued)

(58) Field of Classification Search
CPC ........... H01M 10/625; H01M 10/6569; H01M 10/6551; H01M 10/6557; H01M 10/66;
(Continued)

(56) References Cited

U.S. PATENT DOCUMENTS 6,709,783 B2  3/2004 Ogata et al.
9,147,875 B1* 9/2015 Coakley ................ H01M 2/202
(Continued)

FOREIGN PATENT DOCUMENTS

JP    2000-048867 A    2/2000
JP    2001-023702 A    1/2001
(Continued)

OTHER PUBLICATIONS

Hirano et al., "Boiling Liquid Battery Cooling for Electric Vehicle," published on Sep. 1, 2014 at 2014 IEEE Transportation Electrification Conference and Expo Asia-Pacific (4 pages).
(Continued)

*Primary Examiner* — Cynthia H Kelly
*Assistant Examiner* — Monique M Wills
(74) *Attorney, Agent, or Firm* — Westerman, Hattori, Daniels & Adrian, LLP (57) ABSTRACT

A battery device is provided with cooling bodies for contacting the outer surfaces of a plurality of battery cells arranged inside a battery case, and spacers provided adjacent to the cooling bodies. The cooling bodies absorb or are impregnated with a cooling fluid inside the battery case. Cooling medium vapor flow channels in which cooling medium vapor circulates are formed on the surfaces of the spacers facing the cooling bodies, the cooling medium vapor being generated by the evaporation of the cooling fluid of the cooling bodies.

12 Claims, 6 Drawing Sheets

(51) Int. Cl.
  *H01M 10/625* (2014.01)
  *H01M 10/6569* (2014.01)
  *H01M 10/6555* (2014.01)

(52) U.S. Cl.
  CPC ....... *H01M 10/6569* (2015.04); *H01M 10/66* (2015.04); *H01M 2220/20* (2013.01)

(58) Field of Classification Search
  CPC ............ H01M 2/1077; H01M 10/647; H01M 2220/20
  See application file for complete search history.

(56) References Cited

U.S. PATENT DOCUMENTS

| | | | |
|---|---|---|---|
| 9,437,857 B2 | 9/2016 | Yoshioka et al. | |
| 2006/0232135 A1* | 10/2006 | Kim | H01M 2/1077 307/43 |
| 2009/0176148 A1 | 7/2009 | Jiang et al. | |
| 2014/0220404 A1 | 8/2014 | Masuda et al. | |
| 2015/0198372 A1* | 7/2015 | Desikan | F28D 1/0366 165/151 |

FOREIGN PATENT DOCUMENTS

| | | |
|---|---|---|
| JP | 2001-196103 A | 7/2001 |
| JP | 2010-15954 A | 1/2010 |
| JP | 2010-211963 A | 9/2010 |
| JP | 2011-509507 A | 3/2011 |
| JP | 2013-62207 A | 4/2013 |
| WO | 2011/105256 A1 | 9/2011 |
| WO | 2012/173269 A1 | 12/2012 |
| WO | 2012/173270 A1 | 12/2012 |

OTHER PUBLICATIONS

Hasegawa et al., "Boiling Liquid Cooling System for Ultra High Rate Charging/Discharging of Lithium Ion Battery," published on Oct. 22, 2014 at 2014 Jidosya Gijutsu Kai (16 pages, including English partial translation).

International Search Report dated Apr. 19, 2016, issued in counterpart International Application No. PCT/JP2016/053725 (2 pages).

Office Action dated Oct. 1, 2019, issued in counterpart JP application No. 2015-023481, with English translation. (9 pages).

* cited by examiner

BATTERY DEVICE

TECHNICAL FIELD

The present invention relates to a battery apparatus (battery device) for cooling a plurality of battery cells mutually juxtaposed in a battery case, utilizing the evaporation latent heat of insulating cooling liquid.

BACKGROUND ART

Electric vehicles such as an electric automobile, a hybrid automobile equipped with an internal combustion engine, and a fuel cell automobile equipped with a fuel cell are equipped with a battery apparatus for supplying electrical energy to an electric motor for driving the vehicle. The battery apparatus of this type includes a plurality of battery cells that are connected in series electrically. These battery cells emit heat produced in chemical reactions at the time of charging and discharging of the battery cells. It is important to suppress the increase in the temperature of the battery cells, for maintaining the operation characteristics of the battery apparatus, and avoiding the decrease in the product life of the battery apparatus.

In such a battery apparatus, for example, according to the technical concept disclosed in the pamphlet of International Publication No. WO2011/105256, a plurality of cooling elements (supports in the form of sponge, etc.) for absorbing insulating cooling liquid stored in a battery case with a predetermined space of the battery case unfilled with the cooling liquid, are brought into contact with each of the battery cells. The evaporation latent heat of the cooling liquid of the cooling element is utilized to cool the battery cells. In the battery apparatus, since the space inside the battery case is not fully filled with the cooling liquid, it is possible to achieve weight reduction of the battery apparatus. In the battery apparatus, the cooling elements are filled between the adjacent battery cells, and between the battery cell and the battery case.

SUMMARY OF INVENTION

In the conventional technique as described in International Publication No. WO2011/105256, since the cooling elements are filled between the adjacent battery cells, and between the battery cells and the battery case, it may not be possible to smoothly guide the gas (coolant steam) produced by evaporation of the cooling liquid of the cooling elements to the outside of the cooling elements. That is, the coolant steam may be retained inside the cooling elements. Under the circumstances, it becomes impossible for the cooling elements to absorb the cooling liquid retained in the battery case efficiently. Since the quantity of the cooling liquid contained in the cooling elements is reduced, the cooling efficiency may be lowered undesirably.

The present invention has been made in consideration of the above problems, and an object of the present invention is to provide a battery apparatus in which it is possible to achieve weight reduction, and suppress the decrease in the cooling efficiency of a battery cell by the evaporation latent heat of cooling liquid of a cooling element.

In order to achieve solve the above problems, a battery apparatus according to the present invention cools a plurality of battery cells mutually juxtaposed in a battery case, utilizing evaporation latent heat of insulating cooling liquid, and includes a cooling element provided between the plurality of battery cells, the cooling element being configured to contact an outer surface of the battery cell, and configured to absorb or be impregnated with cooling liquid in the battery case; and a spacer provided adjacent to the cooling element in a direction in which the plurality of battery cells are arranged, wherein a coolant steam flow groove is famed on a surface of the spacer facing the cooling element, as a passage of coolant steam produced by evaporation of the cooling liquid of the cooling element.

In the structure, since it is possible to guide the cooling liquid in the battery case to outer surfaces of battery cells by the cooling element, even if the space inside the battery case is not filled with the cooling liquid, it is possible to cool the battery cells by the suitable quantity of cooling liquid. Therefore, it is possible to achieve weight reduction of the battery apparatus. Further, since the coolant steam produced by evaporating the cooling liquid of the cooling element is guided from the inside of the cooling element to the coolant steam flow groove of the spacer, it is possible to suppress stagnation of the coolant steam inside the cooling element. In this manner, since the cooling element can absorb or can be impregnated with the cooling liquid stored in the battery case efficiently, it is possible to suppress decrease in the cooling efficiency of the battery cell by the evaporation latent heat of the cooling liquid of the cooling element.

The battery apparatus may further include a heat exchanger configured to cool the coolant steam.

Further, in the structure, since it is possible to condense the coolant steam back to the cooling liquid, it is possible to suppress the shortage of the cooling liquid in the battery case.

In the above battery apparatus, the spacer may be configured to contact the cooling element, and the coolant steam flow groove may be famed by making a recess on at least part of the surface of the spacer which contacts the cooling element.

In the structure, it is possible to hold the cooling element between the battery cell and the spacer, and form the coolant steam flow grooves easily.

In the above battery apparatus, a pair of the cooling elements which contact outer surfaces of each of the battery cells may be provided between the adjacent battery cells, the spacer which contacts the pair of cooling elements may be formed between the pair of cooling elements, and the coolant steam flow grooves may be famed on both surfaces of the spacer which contact the cooling elements.

In the structure, since it is sufficient to provide one spacer between a pair of cooling elements, it is possible to achieve size reduction of the battery apparatus.

In the above battery apparatus, the cooling liquid may be produced by mixing a plurality of kinds of liquid coolants having different boiling points.

In the structure, the boiling point can be set to the desired temperature. Therefore, it is possible to regulate the temperature of the battery cells cooled by the evaporation latent heat of the cooling liquid to become closer to the target operating temperature.

In the above battery apparatus, the spacer may be an open cell foam.

In the structure, it is possible to obtain the spacer having the coolant steam flow grooves easily.

The above battery apparatus may further includes a liquid holder member provided in the battery case, and configured to be impregnated with the cooling liquid, and the cooling element may contact the liquid holder member in order to absorb the cooling liquid which has been impregnated into the liquid holder member.

In the structure, for example, even in the case where the battery apparatus is mounted in an electric vehicle, since the liquid surface position of the cooling liquid in the battery case does not change due to the road surface condition or vibrations, the cooling liquid impregnated into the liquid holder member can be absorbed into the cooling element reliably.

In the present invention, the cooling liquid stored in the battery case can be guided to the outer surfaces of the battery cell by the cooling element. Therefore, it is possible to achieve weight reduction of the battery apparatus. Further, the coolant steam produced by evaporating the cooling liquid of the cooling element is guided to the coolant steam flow groove of the spacer, it is possible to suppress decrease in the cooling efficiency of the battery cell by the evaporation latent heat of the cooling liquid of the cooling element.

DESCRIPTION OF EMBODIMENTS

Hereinafter, preferred embodiments of a battery apparatus according to the present invention will be described below with reference to the accompanying drawings.

First Embodiment

A battery apparatus 10A according to an embodiment of the present invention is mounted in an electric vehicle such as an electric automobile, a hybrid automobile equipped with an internal combustion engine, and a fuel cell automobile equipped with a fuel cell. That is, the battery apparatus 10A is capable of charging electrical energy supplied from a power feeding apparatus, and capable of supplying electrical energy to an electric motor for driving the vehicle. However, the battery apparatus 10A is not limited to an example where the battery apparatus 10A is mounted on such an electric vehicle. The battery apparatus 10A can be utilized in combination with any apparatuses.

Figure 1:
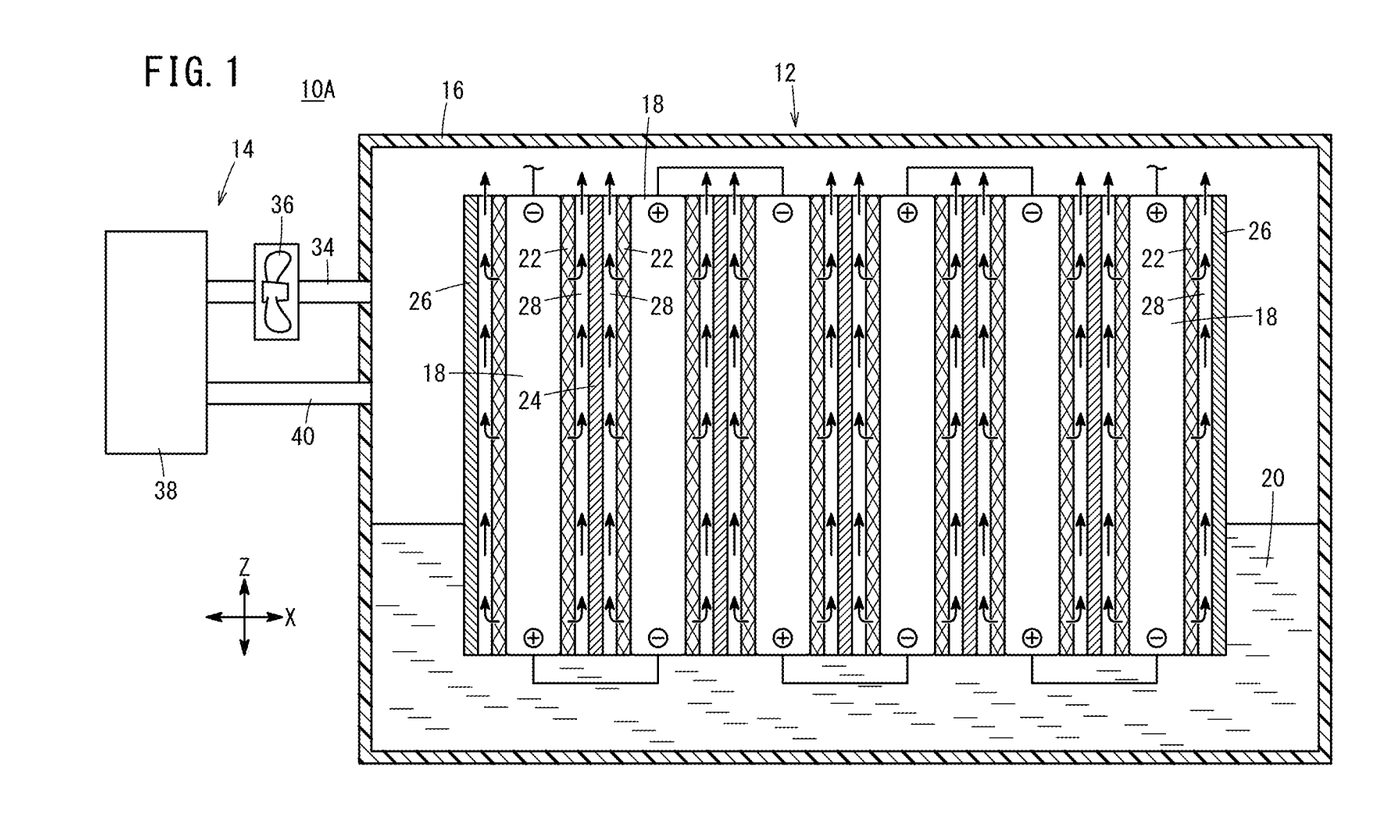
FIG. 1 is a vertical cross sectional view schematically showing a battery apparatus according to a first embodiment of the present invention.

As shown in FIG. 1, the battery apparatus 10A includes a battery body 12 and a battery heat exchanger 14 provided for the battery body 12. The battery body 12 includes a battery case 16 having a rectangular parallelepiped shape, and a plurality battery cells 18 provided in parallel within the battery case 16, insulating cooling liquid 20 stored in the battery case 16, a plurality of cooling elements (wick) 22 provided for the battery cells 18 to absorb the cooling liquid 20 or to be impregnated with the cooling liquid 20, and a plurality of spacers 24, 26 provided adjacent to the cooling elements 22.

The battery cell 18 has known structure where a battery cell body and electrolytic solution are placed in a laminator case. The battery cell body is famed by connecting a plurality of unit cells that are stacked together, electrically in series. Each of the unit cells includes a positive electrode, a separator, and a negative electrode. A plurality of the battery cells 18 are connected electrically and directly. In the embodiment, the battery cell 18 has a rectangular shape in a front view. Six battery cells are arranged in a horizontal direction (indicated by an arrow X) in the state where the longitudinal directions of the battery cells 18 are oriented in a vertical direction (indicated by an arrow Z). The number of the battery cells 18 can be determined arbitrarily.

The cooling elements 22 are provided on the outer surfaces (outer surfaces oriented in the thickness direction of the battery cells 18) on both sides of each of the battery cells 18. Further, the spacer 24 is provided in each space between the adjacent cooling elements 22, and the spacers 26 are provided outside the cooling elements 22 at the outermost positions. That is, the battery cells 18, the cooling elements 22, and the spacers 24, 26 are arranged in the horizontal direction. Further, the battery cells 18, the cooling elements 22, and the spacers 24, 26 are fixed to the battery case 16 in the state where the pair of spacers 26 at the outermost positions are pressed toward each other by a holder mechanism (not shown).

Stated otherwise, a pair of the cooling elements 22 and one spacer 24 are provided in each space between the adjacent battery cells 18. The pair of cooling elements 22 contact the outer surfaces of the battery cells 18, and the spacer 24 is positioned between the pair of cooling elements 22, and contacts these cooling elements 22. The battery cells 18 are cooled utilizing the evaporation latent heat of the cooling liquid 20 which was absorbed by, or impregnated into the cooling elements 22.

The cooling liquid 20 is stored in the battery case 16 in a manner that the each of the battery cells 18 is impregnated with the cooling liquid 20. That is, some space which is not filled with the cooling liquid 20 remains present in the battery case 16. In the structure, it is possible to achieve weight reduction of the battery apparatus 10A. It should be noted that the quantity of the cooling liquid 20 stored in the battery case 16 can be determined arbitrarily.

As the cooling liquid 20, liquid coolant having the boiling point which is substantially equal to the target operating temperature of the battery cells 18 is used. For example, hydrofluoroether such as Novec (registered trademark) 7000 having the boiling point of 34° C. under 1 atm or hydrofluoroketone such as Novec (registered trademark) 649 having the boiling point of 49° C. under 1 atm can be used suitably.

Further, the cooling liquid 20 may be produced by mixing a plurality of kinds of liquid coolants having different boiling points. In this case, the boiling point of the cooling liquid 20 can be set to the desired temperature. Therefore, it is possible to regulate the temperature of the battery cells 18 cooled by the evaporation latent heat of the cooling liquid 20 to become closer to the target operating temperature. Further, the boiling point of the cooling liquid 20 can be set by changing the molecular weight of the liquid coolant.

The cooling element 22 has a shape corresponding to the shape of the battery cell 18. For example, the cooling element 22 has a substantially rectangular shape in a front view. The spacers 24, 26 have the same shape. In the state where the cooling elements 22 are partially impregnated with the cooling liquid 20 (lower parts of the cooling elements 22 are partially impregnated with the cooling liquid 20), the cooling elements 22 contacts substantially the entire outer surfaces on both sides of the battery cell 18. In this manner, the cooling elements 22 can absorb or can be impregnated with the cooling liquid 20 stored in the battery case 16. Consequently, it becomes possible to uniformly impregnate (supply) the cooling liquid 20 into substantially the entire outer surfaces on both sides of each of the cooling elements 22.

As the cooling element 22, for example, microfiber cloth is used. In this case, the cooling liquid 20 can be sucked up efficiently by the capillary pressure. However, the cooling element 22 is not limited to the microfiber cloth. The cooling element 22 may be made of, e.g., porous material. The thickness of the cooling element 22 is determined to have a sufficient size to guide the gas produced when the cooling liquid 20 of the cooling element 22 is evaporated at the time of cooing the battery cell 18 (hereinafter also referred to as the coolant steam), to the surfaces which contact the spacers 24, 26.

For example, the spacer 24 is made of metal, resin, etc. The spacer 24 has the compression strength sufficient to maintain the distance between the adjacent battery cells 18 to have a predetermined value when the pair of the spacers 26 at the outermost positions are pressed toward each other.

Figure 2:
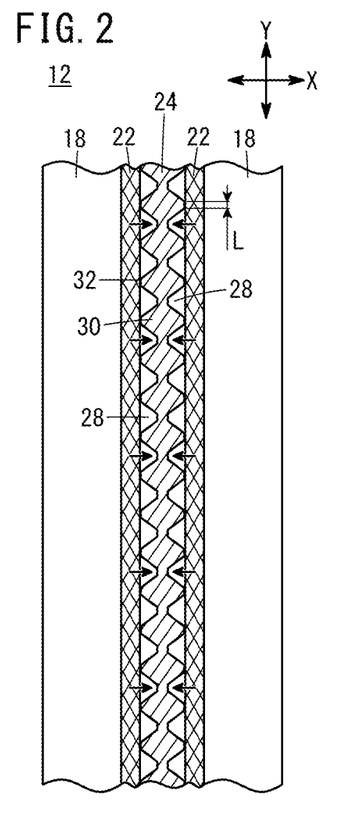
FIG. 2 is a partial enlarged cross sectional view of a battery body shown in FIG. 1.

As shown in FIG. 2, the spacer 24 has a plurality of coolant steam flow grooves 28 as passages of coolant steam, on its surface which contact the cooling element 22. In the structure, the coolant steam from the inside of the cooling element 22 is guided (supplied) rapidly (smoothly) into the coolant steam flow grooves 28.

In the embodiment of the present invention, each of the coolant steam flow grooves 28 has a substantially V-shape in lateral cross section. The coolant steam flow grooves 28 extend along the spacer 24 in the longitudinal direction (vertical direction indicated by an arrow Z) over the entire length. Therefore, the coolant steam supplied into the coolant steam flow grooves 28 is discharged above the spacer 24. The coolant steam flow grooves 28 have a sufficient flow cross sectional area for the coolant steam to move smoothly.

Further, the coolant steam flow grooves 28 are arranged in the spacer 24 in parallel in the width direction of the spacer 24 (lateral direction of the spacer 24 indicated by the arrow Y in FIG. 2) such that the coolant steam flow grooves 28 face substantially the entire surface of the cooling element 22. That is, peaks 32 of partition walls 30 dividing the coolant steam flow grooves 28 contact the cooling element 22. In the structure, the cooling element 22 is pressed by the spacer 24 such that the cooling element 22 uniformly contacts the battery cell 18. The width L at the peaks 32 of the partition walls 30 is set to have a sufficient size not to cause floating of the portion of the cooling element 22 impregnated with the cooling liquid 20 due to the buoyant force.

As described above, in the embodiment of the present invention, the coolant steam flow grooves 28 are formed by making recesses on at least part of the surface of the spacer 24 which contacts the cooling element 22. Therefore, the cooling element 22 can be held between the battery cell 18 and the spacer 24, and it is possible to form the coolant steam flow grooves 28 easily.

As shown in FIG. 1, the pair of spacers 26 have the same structure as the above described spacer 24 except that a plurality of coolant steam flow grooves 28 are formed only on one surface which contacts the cooling element 22. Therefore, the detailed description about the spacers 26 is omitted.

The heat exchanger 14 includes an inlet channel 34 through which the coolant steam in the battery case 16 is guided, a fan 36 provided for the inlet channel 34, a heat exchanger body 38 for cooling the coolant steam guided from the inlet channel 34, and an outlet channel 40 for guiding the cooling liquid 20 produced by condensing the coolant steam by the heat exchanger body 38 into the battery case 16.

In the embodiment of the present invention, the inlet channel 34 and the outlet channel 40 are connected to the side wall of the battery case 16, and communicated with the inside of the battery case 16. In the structure, the cooling liquid 20 guided from the outlet channel 40 flows along the side wall of the battery case 16, and the cooling liquid 20 can be stored in the battery case 16. However, positions of connecting the inlet channel 34 and the outlet channel 40 to the battery case 16 can be determined arbitrarily. For example, the inlet channel 34 and the outlet channel 40 may be connected to an upper wall of the battery case 16.

The fan 36 forcibly guides the coolant steam in the battery case 16 into the heat exchanger body 38 through the inlet channel 34, and forcibly guides the cooling liquid 20 produced in the heat exchanger body 38 into the battery case 16 through the outlet channel 40. The heat exchanger body 38 may have any structure as long as it can cool, and condense the coolant steam. That is, it is a matter of course that a radiator mounted in the electric vehicle may be used as the heat exchanger body 38.

The battery apparatus 10A according to the present invention basically have the above structure. Next, effects and advantages of the battery apparatus 10A will be described.

In the battery apparatus 10A of the embodiment of the present invention, in the initial state, the cooling liquid 20 stored in the battery case 16 is impregnated into each of the cooling elements 22 made of, e.g., microfiber cloth, and absorbed into the entire cooling elements 22 by the capillary pressure. That is, the cooling liquid 20 contacts substantially the entire outer surfaces on both sides of each of the battery cells 18 through the cooling elements 22.

When the battery apparatus 10A is operated (discharged or charged), heat is emitted from each of the battery cells 18. At this time, the cooling liquid 20 of the cooling element 22 absorbs the heat from the battery cells 18. Therefore, the cooling liquid 20 is evaporated, and the coolant steam is produced. Stated otherwise, the battery cells 18 are cooled by the evaporation latent heat of the cooling liquid 20 of the cooling element 22. Therefore, the operating temperature of the battery cells 18 is cooled up to a temperature close to the boiling point of the cooling liquid 20.

The coolant steam produced in the cooling element 22 is guided smoothly above the spacers 24, 26 through the coolant steam flow grooves 28 of the spacers 24, 26 adjacent to the cooling elements 22. That is, stagnation of the coolant steam inside the cooling elements 22 is suppressed. Therefore, since the cooling elements 22 efficiently absorb or are impregnated with the cooling liquid 20 stored in the battery case 16, predetermined quantity of the cooling liquid 20 is continuously supplied to the entire outer surfaces on both sides of the battery cell 18. Therefore, the temperature of the battery cells 18 is kept at a substantially constant temperature.

After the coolant steam is guided to the upper space in the battery case 16 through the coolant steam flow grooves 28 of the spacers 24, 26, the coolant steam is guided to the heat exchanger body 38 through the inlet channel 34 under operation of the fan 36, and cooled in the heat exchanger body 38. Further, the cooling liquid 20 produced by condensation of the coolant steam by the heat exchanger body 38 flows through the outlet channel 40, and flows along the side wall of the battery case 16. Then, the cooling liquid 20 is stored in the battery case 16. That is, even during operation of the battery apparatus 10A, the shortage of the cooling liquid 20 stored in the battery case 16 is suppressed. Accordingly, it is possible to continuously cool the battery cell 18 by the predetermined quantity of cooling liquid 20.

In the embodiment of the present invention, the cooling liquid 20 stored in the battery case 16 can be guided to the outer surfaces of the battery cells 18 by the cooling elements 22. Therefore, even if the space inside the battery case 16 is not fully filled with the cooling liquid 20, it is possible to cool the battery cells 18 using the suitable quantity of cooling liquid 20. Therefore, it is possible to achieve weight reduction of the battery apparatus 10A.

Further, since the coolant steam (gas) produced by evaporating the cooling liquid 20 of the cooling elements 22 can be guided from the inside of the cooling elements 22 to the coolant steam flow grooves 28 of the spacers 24, 26, it is possible to suppress stagnation of the coolant steam inside the cooling elements 22. In this manner, since the cooling elements 22 can absorb or can be impregnated with the cooling liquid 20 stored in the battery case 16 efficiently, it is possible to suppress decrease in the cooling efficiency of the battery cells 18 by the evaporation latent heat of the cooling liquid 20 of the cooling elements 22.

Further, since it is possible to condense the coolant steam by the heat exchanger 14 back to the cooling liquid 20, it is possible to suppress the shortage of the cooling liquid 20 in the battery case 16.

Further, since the coolant steam flow grooves 28 is formed by making recesses on at least part of the surfaces of the spacers 24, 26 which contact the cooling elements 22, it is possible to hold the cooling elements 22 between the battery cells 18 and the spacers 24, 26, and form the coolant steam flow grooves 28 easily.

Moreover, the pair of cooling elements 22 are provided between the adjacent battery cells 18 in a manner that the cooling elements 22 contact the outer surfaces of each of the battery cells 18, and one spacer 24 is provided between the pair of cooling elements 22 in a manner that the spacer 24 contacts the cooling elements 22, to form the coolant steam flow grooves 28 on both surfaces of the spacer 24 which contacts the cooling elements 22. Therefore, it is possible to achieve size reduction of the battery apparatus 10A.

Figure 3:
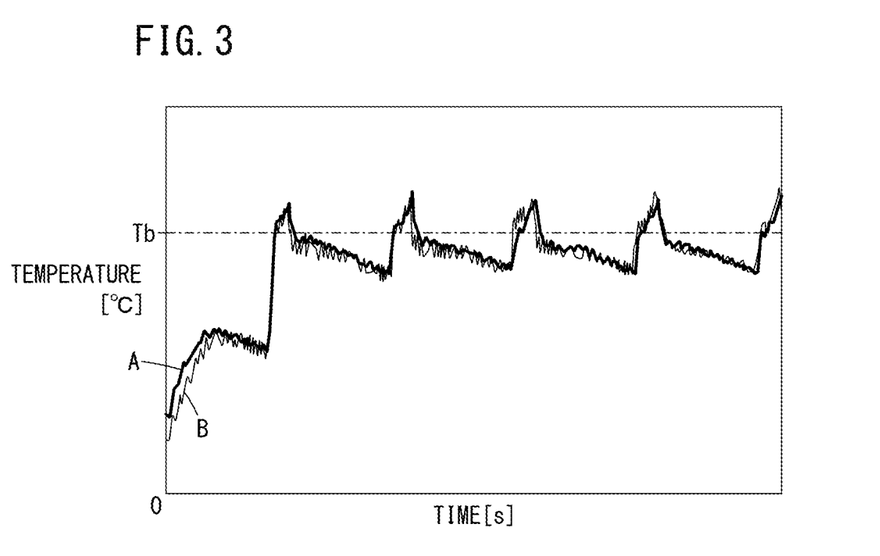
FIG. 3 is a graph showing the change in the temperature of a battery cell.

Next, effects and advantages of the battery apparatus 10A according to the embodiment of the present invention will be descried further in detail with reference to a graph of FIG. 3. FIG. 3 is a graph showing the change in the temperature of the battery cell 18 when the battery apparatus 10A is operated. In FIG. 3, a solid bold line A indicates the change in the temperature of the battery cell 18 of the battery apparatus 10A according to the embodiment of the present invention, and a solid narrow line B indicates the change in the temperature of a battery cell according to a comparative example. The temperature Tb indicates the boiling point of the cooling liquid 20.

In the battery apparatus according to the comparative example, the spacers 24, 26 of the above described battery apparatus 10A are omitted. The cooling element 22 is made of porous material, and all of the battery cells 18 are completely impregnated with the cooling liquid (the space inside the battery case is filled with the cooling liquid). The structure of the battery apparatus according to the comparative example is the same as the structure of the battery apparatus 10A in other respects.

As can be understood from FIG. 3, the temperature of the battery cell 18 of the battery apparatus 10A according to the embodiment of the present invention is maintained at a temperature close to the boiling point of the cooling liquid 20 during operation of the battery apparatus 10A, as in the case of the battery apparatus according to the comparative example. That is, the cooling element 22 is made of microfiber cloth having relatively high capillary pressure, and the spacers 24, 26 having the coolant steam flow grooves 28 are provided. It can be seen that, even if the quantity of the cooling liquid 20 is small, it is possible obtain the cooling effects equal to the battery cell of the battery apparatus according to the comparative example.

In the battery apparatus 10A, the coolant steam flow groove 28 may extend in the entire width direction of the spacers 24, 26 (indicated by the arrow Y), and a plurality of the coolant steam flow grooves 28 may be arranged in the longitudinal direction of the spacers 24, 26 (indicated by the arrow z). Also in this case, the above described effects and advantages are obtained in the battery apparatus 10A. Also in a battery apparatus 10B according to a second embodiment described later, the same effects and advantages are obtained.

Second Embodiment

Next, the battery apparatus 10B according to the second embodiment of the present invention will be described with reference to FIG. 4. In the battery apparatus 10B according to the second embodiment, the constituent components having the same or similar functions and advantages as or to that of the battery apparatus 10A according to the first embodiment are labeled with the same reference numerals, and detailed description is omitted. Also in a battery apparatus 10C according to a third embodiment, the constituent components having the same or similar functions and advantages as or to that of the battery apparatus 10A according to the first embodiment are labeled with the same reference numerals, and detailed description is omitted.

Figure 4:
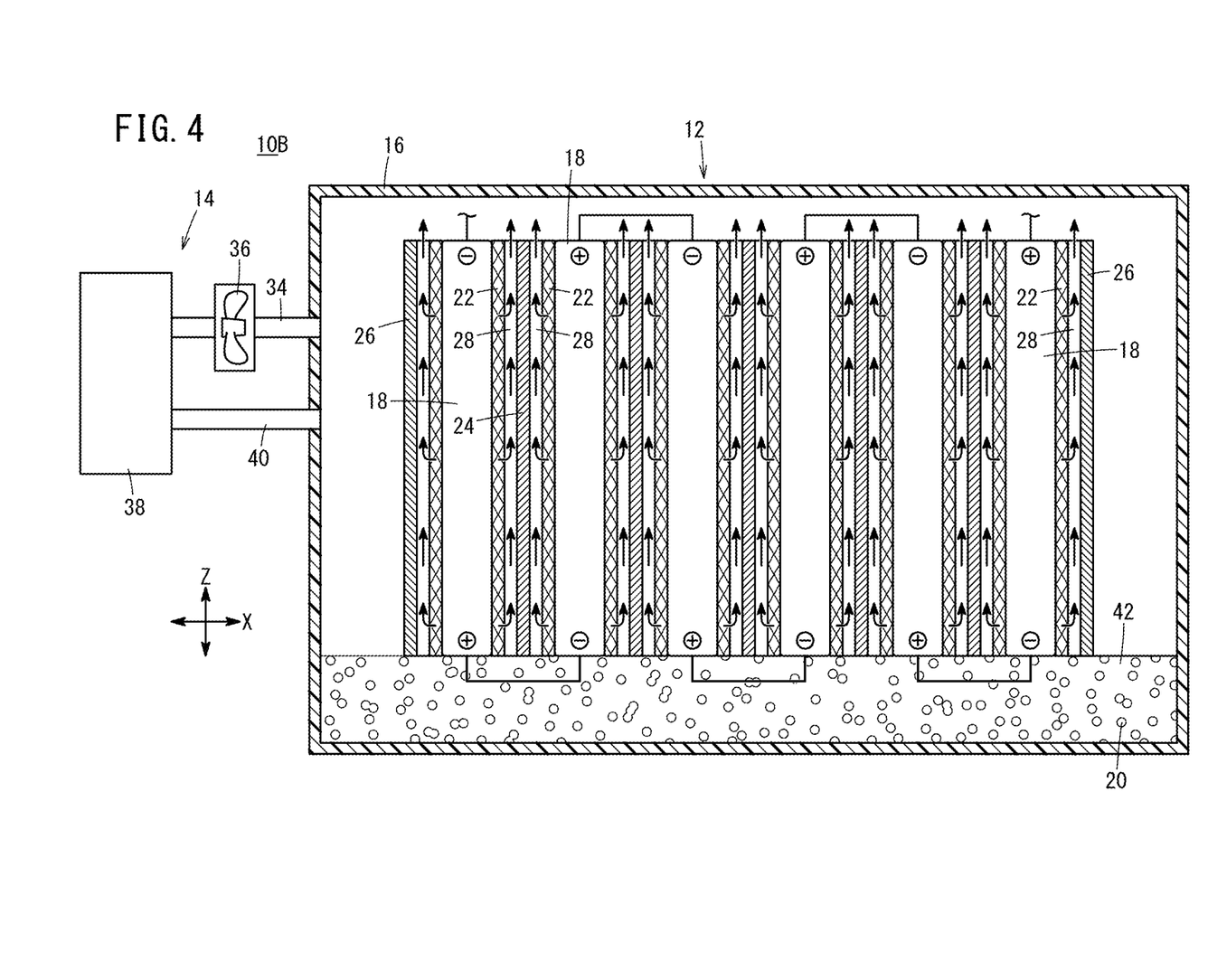
FIG. 4 is a vertical cross sectional view schematically showing a battery apparatus according to a second embodiment of the present invention.

As shown in FIG. 4, the battery apparatus 10B according to the embodiment of the present invention further includes a liquid holder member 42 impregnated with cooling liquid 20. For example, the liquid holder member 42 may be an open cell foam (continuous foaming body) made of porous material. Each of the cooling elements 22 contacts the liquid holder member 42 at its lower end surface. Therefore, the cooling liquid 20 in the liquid holder member 42 is absorbed into each of the cooling elements 22 by the capillary pressure.

In the embodiment of the present invention, even if the battery apparatus 10B is mounted in an electric vehicle, since the liquid surface of the cooling liquid 20 in the battery case 16 does not change due to the road surface condition or vibrations, the cooling liquid 20 impregnated into the liquid holder member 42 can be absorbed into the cooling element 22 reliably.

Third Embodiment

Figure 5:
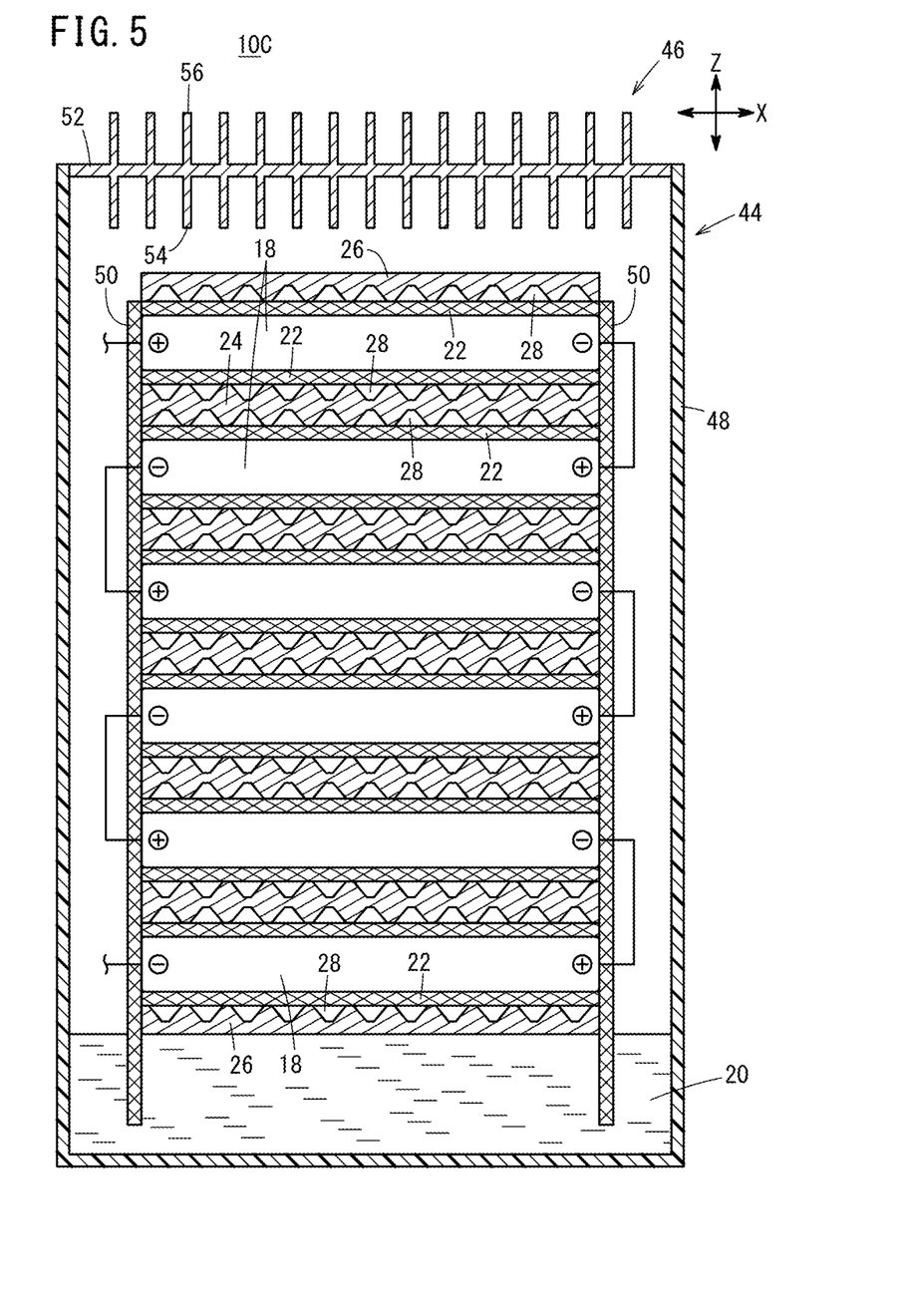
FIG. 5 is a vertical cross sectional view schematically showing a battery apparatus according to a third embodiment of the present invention.

Next, the battery apparatus 10C according to the third embodiment of the present invention will be described with reference to FIG. 5. As shown in FIG. 5, the battery apparatus 10C according to the embodiment of the present invention includes a battery body 44 and a heat exchanger 46. The battery body 44 includes a rectangular parallelepiped battery case 48. In the battery case 48, six battery cells 18 are arranged in a vertical direction indicated by an arrow Z in a state where the longitudinal direction of the battery cells 18 is oriented in a horizontal direction (the direction perpendicular to the paper surface in FIG. 5). The number of the battery cells 18 can be determined arbitrarily.

Further, the cooling elements 22 are provided on the outer surfaces on both sides of the battery cells 18. A spacer 24 is provided in each space between the adjacent cooling elements 22, and spacers 26 are provided outside the cooling elements 22 at the outermost positions. That is, the battery cells 18, the cooling elements 22, and the spacers 24, 26 are arranged in the vertical direction.

Further, the battery body 44 includes a supply part 50 for supplying the cooling liquid 20 stored in the battery case 48 to each of the cooling elements 22. In the state where the supply part 50 contacts each of the cooling elements 22, the supply part 50 is partially impregnated with the cooling liquid 20 stored in the battery case 48. The supply part 50 is made of microfiber cloth or porous material, and can absorb the cooling liquid 20, or can be impregnated with the cooling liquid 20. The supply part 50 is formed integrally with each of the cooling elements 22. Alternatively, the supply part 50 may be provided separately from each of the cooling elements 22.

In the embodiment of the present invention, the supply part 50 is provided at each of both ends of the cooling elements 22 in the width direction (indicated by an arrow X) over the entire length of the cooling elements 22. In the structure, it is possible to supply the cooling liquid 20 stored in the battery case 48 to each of the cooling elements 22 efficiently.

Coolant steam flow grooves 28 formed in the spacers 24, 26 extend in the longitudinal direction of the spacers 24, over the entire length of the spacers 24. Therefore, the coolant steam supplied into the coolant steam flow grooves 28 does not interfere with the supply part 50, and the coolant steam is discharged to the outside of the spacers 24, 26. Further, the coolant steam flow grooves 28 are arranged in parallel in the width direction of the spacers 24, 26 in the direction indicated by an arrow X such that the coolant steam flow grooves 28 face at least substantially the entire surfaces of the cooling elements 22.

The heat exchanger 46 includes a support part 52, a plurality of cooling fins 54, and a plurality of heat radiation fins 56. The support part 52 closes an upper opening of the battery case 48. The cooling fins 54 extend from the support part 52 downward inside the battery case 48. The radiation fins 56 extend from the support part 52 upward outside the battery case 48. For example, the heat exchanger 46 is made of metal material, etc.

The radiation fins 56 may be cooled forcibly by the wind generated by a fan, etc. (not shown). In this case, it is possible to efficiently release the heat transmitted to the cooling fins 54 by heat exchange with the coolant steam to the outside through the support part 52 and the heat radiation fins 56.

In the battery apparatus 10C according to the embodiment of the present invention, in the initial state, the cooling liquid 20 stored in the battery case 48 is absorbed into each of the cooling elements 22 through the supply part 50, and impregnated into the entire cooling elements 22. That is, the cooling liquid 20 contacts substantially the entire outer surfaces on both sides of each of the battery cells 18 through the cooling elements 22.

Further, when heat is emitted from each of the battery cells 18, the battery cells 18 are cooled by the evaporation latent heat of the cooling liquid 20 in the cooling elements 22. The cooling steam produced at this time is discharged to the outside of the spacer 24 through the coolant steam flow grooves 28, and contacts the cooling fins 54 of the heat exchanger 46, and the coolant steam is cooled by the cooling fins 54. Further, the cooling liquid 20 produced by condensation of the coolant steam at the cooling fins 54 is dropped downward, and eventually, stored in the battery case 48. In the battery apparatus 10C according to the embodiment of the present invention, the same effects and advantages as in the case of the battery apparatus 10A according to the above described first embodiment are obtained.

The battery apparatus 10C may include the above described liquid holder member 42 shown in FIG. 4. In this case, the battery apparatus 10C has the same effects and advantages as in the case of the battery apparatus 10B according to the second embodiment.

Figure 6A:
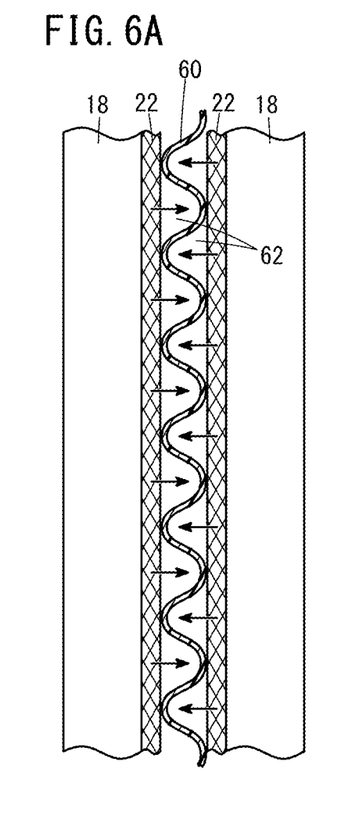
FIG. 6A is a partial cross sectional view showing a spacer according to a first modified embodiment.

The battery apparatuses 10A to 10C are not limited to the above described structure. The battery apparatuses 10A to 10C may include a spacer 60 according to a first modified embodiment shown in FIG. 6A instead of the spacer 24. This spacer 60 is formed by corrugating a thin resin plate. In the structure, it is possible to form the coolant steam flow grooves 62 on both surfaces of the spacer 60 easily.

Figure 6B:
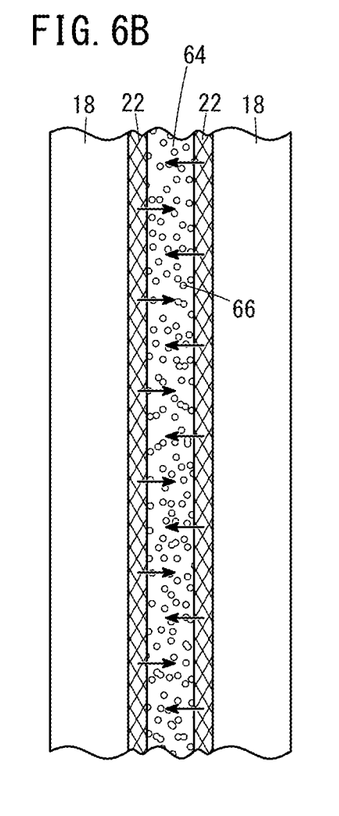
FIG. 6B is a partial cross sectional view showing a spacer according to a second modified embodiment.

Further, the battery apparatuses 10A to 10C may have a spacer 64 according to a second modified embodiment shown in FIG. 6B instead of the spacers 24, 26. For example, the spacer 64 is an open cell foam made of metal such as aluminum. In the structure, it is possible to increase the rigidity of the spacer 64 easily, and form the coolant steam flow grooves 66 in the spacer 64.

The invention claimed is:

1. A battery apparatus for cooling a plurality of battery cells mutually juxtaposed in a battery case, utilizing evaporation latent heat of insulating cooling liquid, the battery apparatus comprising:
   a cooling element provided between the plurality of battery cells, the cooling element being configured to contact an outer surface of the battery cell, and configured to absorb or be impregnated with cooling liquid in the battery case; and
   a spacer provided adjacent to the cooling element in a direction in which the plurality of battery cells are arranged,
   wherein a coolant steam flow groove is formed on a surface of the spacer facing the cooling element, the coolant steam flow groove being configured as a passage of coolant steam produced by evaporation of the cooling liquid of the cooling element, and
   wherein a part of the cooling element is immersed in the cooling liquid retained in the battery case.

2. The battery apparatus-according to claim 1, further comprising a heat exchanger configured to cool the coolant steam.

3. The battery apparatus according to claim 1, wherein the spacer is configured to contact the cooling element; and
   the coolant steam flow groove-is formed by making a recess on at least part of the surface of the spacer which contacts the cooling element.

4. The battery apparatus according to claim 1, wherein a pair of the cooling elements which contact outer surfaces of each of the battery cells are provided between the adjacent battery cells;
   the spacer which contacts the pair of cooling elements is formed between the pair of cooling elements; and the coolant steam flow grooves are formed on both surfaces of the spacer-which contact the cooling elements.

5. The battery apparatus according to claim 1, wherein the cooling liquid is produced by mixing liquid coolants having different boiling points.

6. The battery apparatus according to claim 1, wherein the spacer is an open cell foam.

7. A battery apparatus for cooling a plurality of battery cells mutually juxtaposed in a battery case, utilizing evaporation latent heat of insulating cooling liquid, the battery apparatus comprising:
a cooling element provided between the plurality of battery cells, the cooling element being configured to contact an outer surface of the battery cell, and configured to absorb or be impregnated with cooling liquid in the battery case;
a spacer provided adjacent to the cooling element in a direction in which the plurality of battery cells are arranged; and
a liquid holder member provided in the battery case, and configured to be impregnated with the cooling liquid,
wherein a coolant steam flow groove is formed on a surface of the spacer facing the cooling element, the coolant steam flow groove being configured as a passage of coolant steam produced by evaporation of the cooling liquid of the cooling element, and
wherein the cooling element contacts the liquid holder member in order to absorb the cooling liquid which has been impregnated into the liquid holder member, and wherein a part of the cooling element is immersed in the cooling liquid retained in the battery case.

8. The battery apparatus-according to claim 7, further comprising a heat exchanger configured to cool the coolant steam.

9. The battery apparatus according to claim 7, wherein the spacer is configured to contact the cooling element; and
the coolant steam flow groove-is formed by making a recess on at least part of the surface of the spacer which contacts the cooling element.

10. The battery apparatus according to claim 7, wherein a pair of the cooling elements which contact outer surfaces of each of the battery cells are provided between the adjacent battery cells;
the spacer which contacts the pair of cooling elements is formed between the pair of cooling elements; and
the coolant steam flow grooves are formed on both surfaces of the spacer which contact the cooling elements.

11. The battery apparatus according to claim 7, wherein the cooling liquid is produced by mixing liquid coolants having different boiling points.

12. The battery apparatus according to claim 7, wherein the spacer is an open cell foam.

* * * * *